G. A. CROW.
TRAVIS WHEEL.
APPLICATION FILED SEPT. 17, 1908.
910,787.
Patented Jan. 26, 1909.
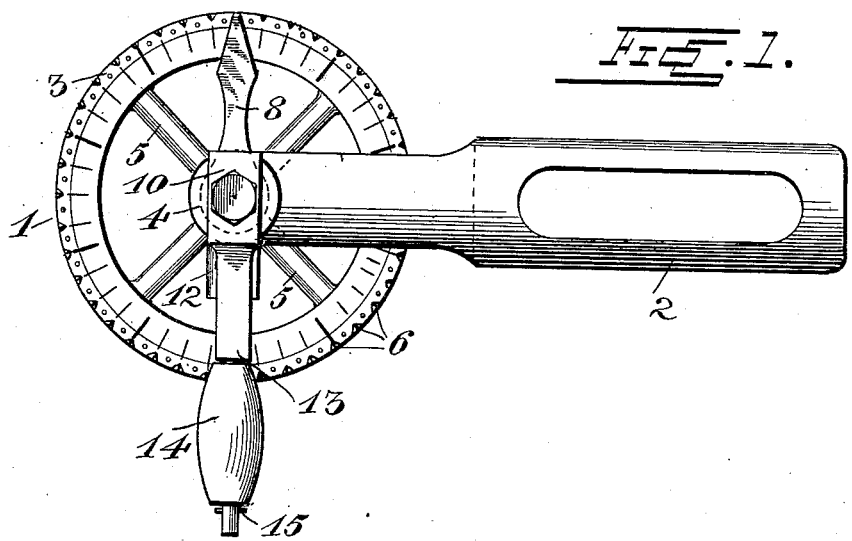
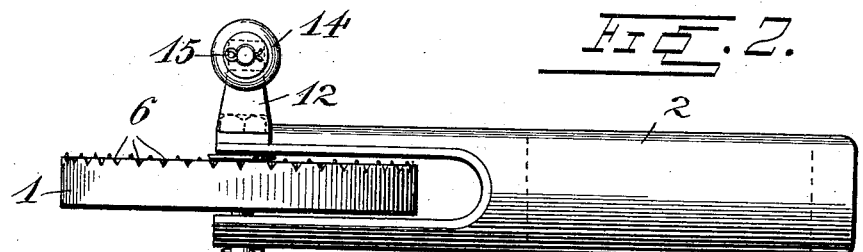
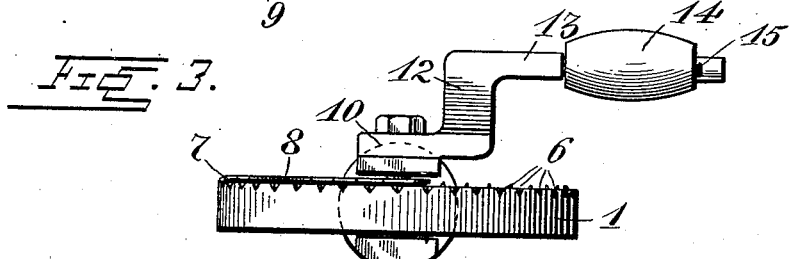
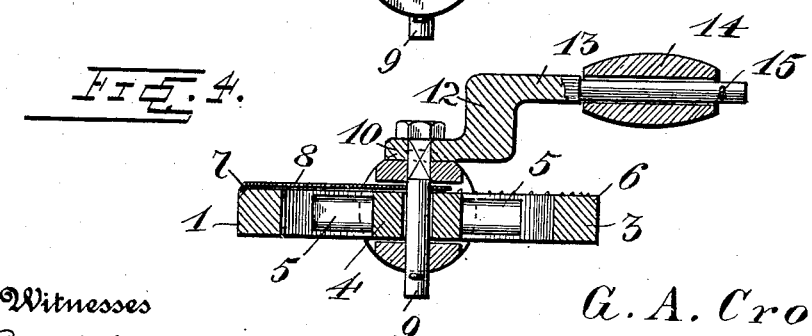
Witnesses
C. Munter
C. H. Giersbauer
Inventor
G. A. Crow
by H. A. Willson and Co.
Attorney

UNITED STATES PATENT OFFICE.

GEORGE A. CROW, OF EL DORADO, ARKANSAS.

TRAVIS-WHEEL.

No. 910,787.  Specification of Letters Patent.  Patented Jan. 26, 1909.

Application filed September 17, 1908. Serial No. 453,551.

*To all whom it may concern:*

Be it known that I, GEORGE A. CROW, a citizen of the United States, residing at El Dorado, in the county of Union and State of Arkansas, have invented certain new and useful Improvements in Travis-Wheels; and I do declare the following to be a full, clear, and exact description of the invention, such as will enable others skilled in the art to which it appertains to make and use the same.

This invention relates to improvements in wheels for measuring vehicle tires or the like commonly known to the trade as traverse or travis wheels.

The object of the invention is to provide a device of this character whereby a tire, wheel or other circular object may be accurately and quickly measured, means being provided whereby the device may be supported and guided in its movement around the tire.

A further object is to provide a measuring wheel of this character which will be simple and inexpensive in construction, reliable and efficient in use and well adapted to the purpose for which it is intended.

With these and other objects in view, the invention consists of certain novel features of construction, combination and arrangement of parts, as will be hereinafter more fully described and particularly pointed out in the appended claims.

In the accompanying drawings:—Figure 1 is a plan view of a measuring wheel constructed in accordance with the invention; Fig. 2 is a side elevation thereof; Fig. 3 is an end elevation of the same; and Fig. 4 is a vertical sectional view on a line with the pivot of the wheel.

Referring more particularly to the drawings, 1 denotes the wheel of the device which is pivotally mounted in the outer bifurcated or forked end of a handle 2. The wheel 1 is preferably formed of an outer rim 3 which is connected to a centrally disposed hub 4 by means of spokes 5. On the upper side of the rim 3 is arranged a graduated scale by which the rim is divided off into inches or fractions thereof. In the outer edge of the rim opposite each quarter inch mark is formed a notch or recess 6, in which is adapted to be seated the laterally bent point 7 of an indicating finger 8. Said indicating finger 8 is pivotally mounted upon the shaft or axle 9 of the wheel 1, whereby it may be lifted and moved to any desired scale mark and which when the point 7 is pushed into the notch opposite said scale mark will be held in this position.

On the outer end of the upper member of the forked end of the handle 2 is secured a plate 10 on which is formed an upwardly projecting spacing block 12 provided with a laterally projecting right-angularly disposed bearing arm 13. The outer end of the arm is reduced and rounded to form a bearing shaft for a guiding and supporting roller 14, said roller being held in place on said bearing arm by means of a cotter pin 15 or other suitable retaining device. The roller 14 preferably tapers from its center toward each end thereof, thereby assuming a double frusto conical shape.

When it is desired to measure a tire or other circular object the periphery of the wheel 1 is engaged with the periphery of the tire with the roller 14 resting upon the rim of the wheel, thereby supporting the wheel 1 in its movement around the periphery of the tire, thus causing the same to travel in the same plane which makes a more accurate measurement than would be attained should the wheel 1 deviate from a straight course while being moved around the periphery of the tire, thus increasing the accuracy and reliability of the measuring wheel.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claims.

Having thus described my invention, what I claim as new and desire to secure by Letters-Patent, is:—

1. In a device for measuring circumferences the combination with a handle, of a graduated wheel revolubly mounted in said handle and having a series of notches in its periphery, a revolubly mounted pointer on said wheel having a depending tooth to be engaged with one of said notches to hold the pointer in adjusted position.

2. In a measuring device of the character described, the combination with a handle having a bifurcated or forked outer end, of a graduated wheel revolubly mounted in the forked end of said handle, said wheel having formed in its periphery a series of notches, one of which is arranged opposite each graduation mark of said wheel, a pointer adjustably mounted on said wheel, a right angularly projecting point formed on the end of said pointer and adapted to be engaged with one of said notches thereby holding said pointer in its adjusted positions, a right angularly projecting bearing arm secured to the outer end of said handle and spaced above said wheel, and a double frusto-conical shaped supporting and guiding roller journaled on the reduced outer end of said bearing arm, substantially as described and for the purpose set forth.

In testimony whereof I have hereunto set my hand in presence of two subscribing witnesses.

GEORGE A. CROW.

Witnesses:
T. W. WILLIAMS,
J. M. McCAIN.